United States Patent
Williams

(12) 
(10) Patent No.: US 12,152,556 B2
(45) Date of Patent: *Nov. 26, 2024

(54) AIR FILTER FOR TURBOCHARGERS AND SUPERCHARGERS

(71) Applicant: K&N Engineering, Inc., Riverside, CA (US)

(72) Inventor: Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 17/398,163

(22) Filed: Aug. 10, 2021

(65) Prior Publication Data

US 2021/0363946 A1 Nov. 25, 2021

Related U.S. Application Data

(60) Continuation of application No. 16/542,059, filed on Aug. 15, 2019, now Pat. No. 11,092,120, which is a
(Continued)

(51) Int. Cl.
*B01D 46/00* (2022.01)
*B01D 46/24* (2006.01)
(Continued)

(52) U.S. Cl.
CPC ... *F02M 35/02416* (2013.01); *B01D 46/0004* (2013.01); *B01D 46/2403* (2013.01);
(Continued)

(58) Field of Classification Search
CPC ............ B01D 46/0004; B01D 46/2403; B01D 46/524; B01D 46/2414; B01D 46/0005;
(Continued)

(56) References Cited

U.S. PATENT DOCUMENTS 2,601,172 A  6/1952  Sebok
2,815,825 A  12/1957  Dreznes
(Continued)

*Primary Examiner* — Minh Chau T Pham
(74) *Attorney, Agent, or Firm* — Rutan & Tucker LLP; Hani Z. Sayed

(57) ABSTRACT

An apparatus and a method are provided for an air filter configured to be mounted onto air inlets of turbochargers and superchargers. The air filter a proximal base including an inlet receiver configured to receive an air inlet, a clamp to secure the air inlet within the inlet receiver, and a first opening aligned with a screw mechanism of the clamp. A filter medium fastened to the proximal base is configured to remove particulate matter and other contaminates from an incoming air stream. A distal end cap fastened to the filter medium comprises a second opening aligned with the first opening. A conduit within an interior cavity of the air filter is disposed between the first opening and the second opening, facilitating tightening and loosening the clamp by extending an appropriate tool through the interior cavity so as to engage the screw mechanism of the clamp.

18 Claims, 3 Drawing Sheets

Related U.S. Application Data division of application No. 15/453,808, filed on Mar. 8, 2017, now Pat. No. 10,473,066.

(60) Provisional application No. 62/305,709, filed on Mar. 9, 2016.

(51) Int. Cl.
*B01D 46/52* (2006.01)
*F02M 35/024* (2006.01)
*F02M 35/10* (2006.01)
*F16L 21/06* (2006.01)
*F16L 33/08* (2006.01)

(52) U.S. Cl.
CPC ....... *B01D 46/521* (2013.01); *F02M 35/0245* (2013.01); *F02M 35/10157* (2013.01); *B01D 2265/027* (2013.01); *B01D 2279/60* (2013.01); *Y02T 10/12* (2013.01)

(58) Field of Classification Search
CPC .......... B01D 2265/027; B01D 2279/60; F02M 35/02416; F02M 35/0245; F02M 35/10157; F02M 35/02483; F02M 35/02425
USPC .............. 55/385.3, 490, 493, 498, 502, 521; 123/198 E See application file for complete search history.

(56) References Cited

U.S. PATENT DOCUMENTS

| | | | |
|---|---|---|---|
| 5,112,372 A | 5/1992 | Boeckermann | |
| 5,275,636 A * | 1/1994 | Dudley | F02M 35/04 55/502 |
| 5,961,696 A * | 10/1999 | Gombos | B01D 46/2411 55/502 |
| 5,968,216 A * | 10/1999 | Powell | F24F 7/003 55/506 |
| 6,360,731 B1 | 3/2002 | Chang | |
| 7,055,225 B1 | 6/2006 | Brant, Jr. et al. | |
| 9,370,740 B2 * | 6/2016 | Hill | B01D 46/521 |
| 9,510,718 B2 * | 12/2016 | Schultz | B01D 46/2414 |
| 9,675,225 B2 * | 6/2017 | Williams | B01D 46/4227 |
| 10,434,449 B1 * | 10/2019 | Coupal | B01D 46/58 |
| 10,473,066 B2 * | 11/2019 | Williams | F02M 35/10157 |
| 11,092,120 B2 * | 8/2021 | Williams | B01D 46/521 |
| 2004/0065206 A1 | 4/2004 | Walker, Jr. | |
| 2009/0025347 A1 * | 1/2009 | DeLillo | B01D 46/001 55/290 |

\* cited by examiner

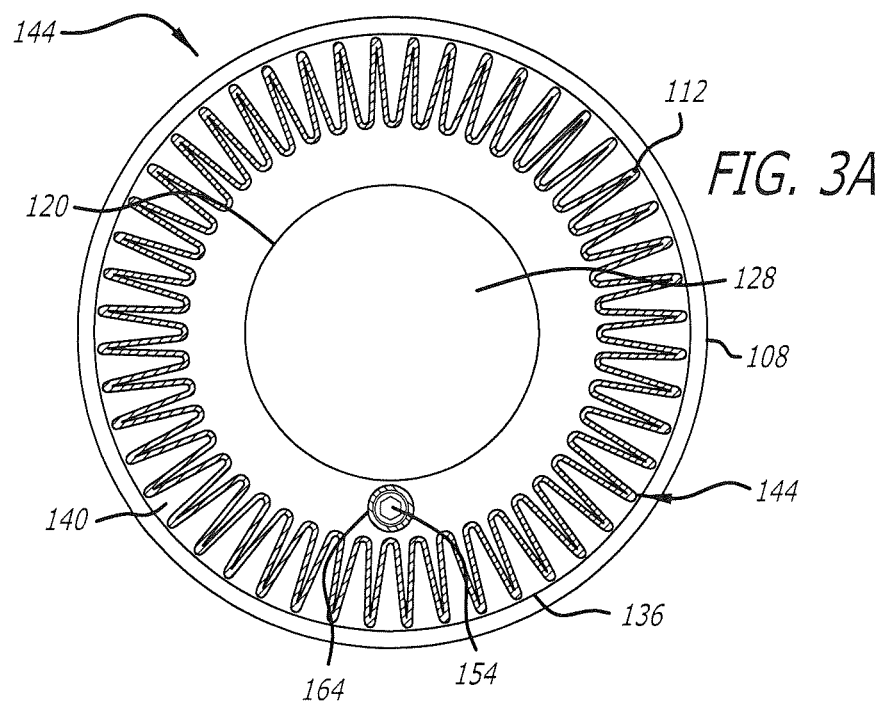
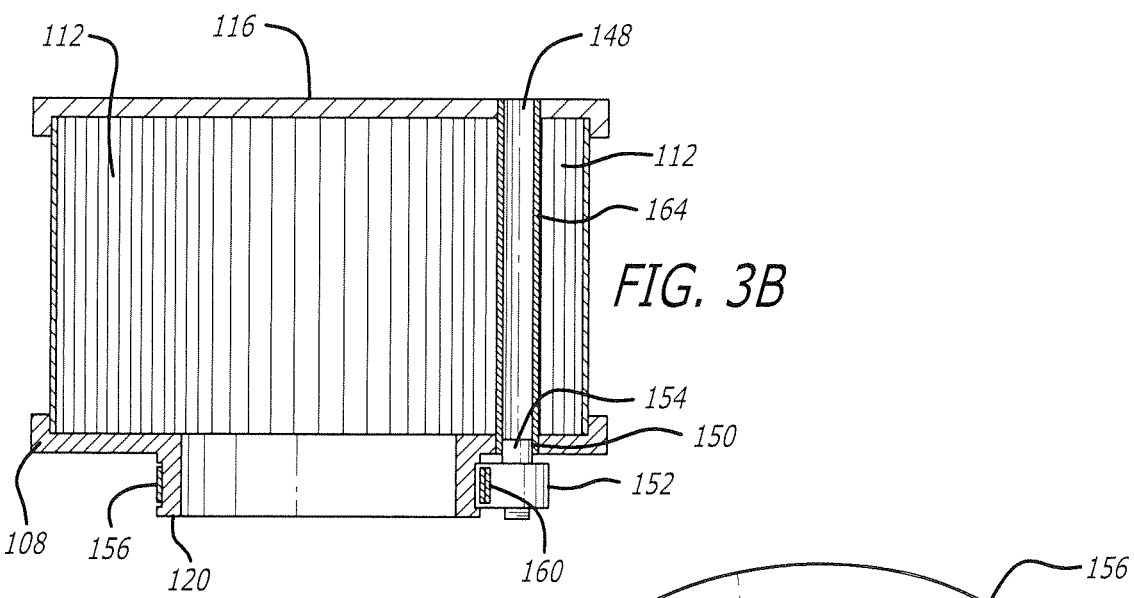
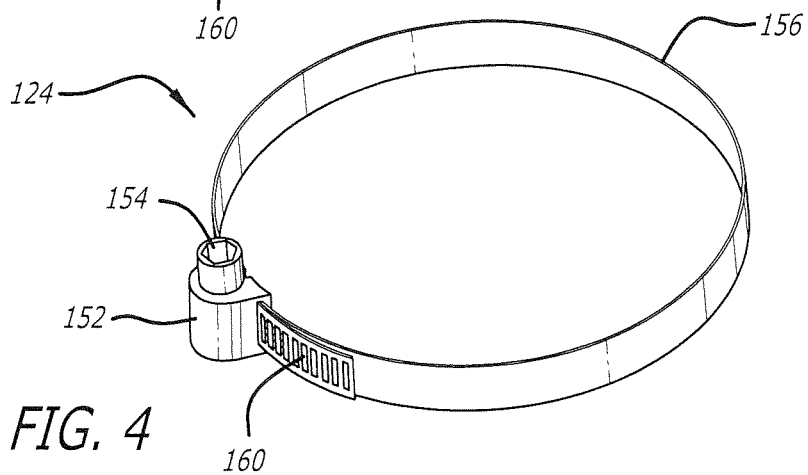

AIR FILTER FOR TURBOCHARGERS AND SUPERCHARGERS

PRIORITY

This continuation application claims the benefit of and priority to U.S. patent application Ser. No. 16/542,059 filed Aug. 15, 2019, now U.S. Pat. No. 11,092,120 and U.S. patent application Ser. No. 15/453,808 filed on Mar. 8, 2017, now U.S. Pat. No. 10,473,066 and U.S. Provisional Application, entitled "Air Filter for Turbocharger and Centrifugal Supercharger," filed on Mar. 9, 2016 having application Ser. No. 62/305,709.

FIELD

The field of the present disclosure generally relates to air filters. More particularly, the field of the invention relates to an apparatus and a method for an air filter configured to be coupled with air inlets of turbochargers and superchargers.

BACKGROUND

A turbocharger is generally a turbine-driven, forced induction device configured to increase the efficiency and power of an engine. As compared to a naturally aspirated engine, a turbocharged engine produces greater output power because the turbine forces more air, and proportionately more fuel, into the engine's combustion chambers than atmospheric pressure alone. As will be appreciated by those skilled in the art, turbochargers were once referred to as "turbosuperchargers" when all forced induction devices were classified as "superchargers." At present, however, the term "supercharger" typically is used in reference to only mechanically driven, forced induction devices, such as by way of a belt, gear, shaft, or chain connected to the engine's crankshaft, whereas the term "turbocharger" is used in reference to a turbine driven by the engine's exhaust gas.

Turbochargers find wide use with truck, car, train, aircraft, and construction equipment engines. Turbochargers typically are used with Otto cycle and Diesel cycle internal combustion engines; although more recently, turbochargers have also been found to be useful with automotive fuel cells. One drawback, however, is a lack of specialized or a dedicated line of air filters available for turbochargers and centrifugal superchargers. It will be appreciated that turbochargers and centrifugal superchargers tend to present severe space constraints within engine compartments, thereby limiting the sizes and shapes of potential air filters. Many users rely on short cone-shaped air filters that are designed for other engine applications. Some users resort to making their own screen covers for the turbocharger air inlet.

Those skilled in the art will recognize that the shape of a housing of the turbocharger or supercharger, referred to as a "snail," presents unique challenges. An inlet receiver of the air filter must be inset into a scroll of the turbocharger or supercharger, thus requiring the user to expose the base of the air filter in order to access and tighten a clamp of the air filter. This encourages the user to apply force to the air filter in an attempt to expose the base, potentially damaging the air filter in the process. Consequently, another drawback is that conventional air filters are not easily installable onto turbochargers and superchargers without potentially damaging the air filters. What is needed, therefore, is an air filter which fits tightly onto air inlets of turbochargers and superchargers without the base of the air filter having to be exposed during installation of the air filter.

SUMMARY

An apparatus and a method are provided for an air filter configured to be mounted onto air inlets of turbochargers and superchargers. The air filter comprises a proximal base including an inlet receiver configured to receive an air inlet, a clamp to secure the air inlet within the inlet receiver, and a first opening aligned with a screw mechanism of the clamp. A filter medium fastened to the proximal base is configured to remove particulate matter and other contaminates from an incoming air stream. In some embodiments, the filter medium comprises paper, foam, cotton, spun fiberglass, or other known filter materials, woven or non-woven material, synthetic or natural, or any combination thereof. In some embodiments, the filter medium comprises a filter oil composition to enhance air cleaning properties of the filter medium. A distal end cap fastened to the filter medium comprises a second opening aligned with the first opening. A conduit within an interior cavity of the air filter is disposed between the first opening and the second opening, facilitating tightening and loosening the clamp by extending an appropriate tool through the interior cavity so as to engage the screw mechanism of the clamp. The conduit facilitates guiding the tool through the interior cavity to the screw mechanism while also serving to prevent unfiltered air from entering through the first opening and the second opening into the air inlet.

In an exemplary embodiment, an air filter configured to be mounted onto air inlets of turbochargers and superchargers comprises a proximal base configured to support the air filter and provide an interface between the air filter and an air inlet of a turbocharger or a supercharger, the proximal base comprising an inlet receiver configured to receive the air inlet, a clamp configured to secure the air inlet within the inlet receiver, and a first opening aligned with a screw mechanism of the clamp; a filter medium fastened to the proximal base and configured to remove particulate matter and other contaminates from an incoming air stream; a distal end cap fastened to the filter medium and comprising a second opening aligned with the first opening; and a conduit within an interior cavity of the air filter and disposed between the first opening and the second opening; wherein the first opening and the second opening facilitate tightening and loosening the clamp by extending an appropriate tool through the interior cavity by way of the conduit so as to engage the screw mechanism of the clamp.

In another exemplary embodiment, the filter medium is comprised of paper, foam, cotton, spun fiberglass, or other known filter materials, woven or non-woven material, synthetic or natural, or any combination thereof. In another exemplary embodiment, the filter medium is pleated or otherwise shaped or contoured to increase a surface area for passing the air stream to be cleaned. In another exemplary embodiment, the filter medium comprises a filter oil composition to enhance air cleaning properties of the filter medium.

In another exemplary embodiment, the distal end cap is comprised of a material which is sufficiently hard so as to retain the filter medium in a desired configuration and support the air filter when coupled to the air inlet of the turbocharger or the supercharger. In another exemplary embodiment, the conduit is configured to guide an appropriate tool through the interior cavity to the screw mechanism. In another exemplary embodiment, the conduit prevents unfiltered air from entering through the first opening and the second opening into the air inlet.

In another exemplary embodiment, the clamp comprises a metal band including a perforated portion which is received by the screw mechanism, the perforated portion being configured to receive a worm gear, or other similar component within the screw mechanism capable of engaging the perforated portion, such that turning the worm gear accordingly tightens or loosens the metal band. In another exemplary embodiment, the screw mechanism is configured with a substantially perpendicular orientation with respect to the circumference of the metal band, thereby facilitating engaging the screw mechanism with an appropriate tool by way of the first opening and the second opening.

In an exemplary embodiment, an air filter configured to mount onto an air inlet of a turbocharger comprises a base comprising an inlet receiver configured to couple with the air inlet; a filter medium coupled to the base and configured to remove particle contaminates from air drawn into the air inlet; a cap coupled to the filter medium; a conduit within an interior cavity of the air filter and disposed between a first opening in the base and a second opening in the cap; and a clamp configured to secure the air inlet within the inlet receiver, the clamp being operable by way of the first opening, the conduit, and the second opening.

In another exemplary embodiment, the clamp further comprises a screw mechanism aligned with the first opening, the conduit, and the second opening so as to facilitate operation of the clamp by way of a suitable tool passed through the cap, the conduit, and the base. In another exemplary embodiment, the screw mechanism is configured to enable tightening and loosening of the clamp by way of the suitable tool. In another exemplary embodiment, the conduit is configured to guide the suitable tool through the interior cavity to the screw mechanism. In another exemplary embodiment, the conduit is configured to prevent unfiltered air from entering through the first opening and the second opening into the air inlet.

In an exemplary embodiment, a method for an air filter to mount onto air inlets of turbochargers and superchargers comprises configuring a base comprising an inlet receiver to couple with an air inlet, the base including a first opening; fastening a filter medium to the base, the filter medium configured to remove particle contaminates from air drawn into the air inlet; fastening a cap to the filter medium opposite of the base, the cap including a second opening; extending a conduit from the first opening in the base to the second opening in the cap; configuring a clamp to secure the air inlet within the inlet receiver; and placing the clamp onto inlet receiver.

In another exemplary embodiment, extending the conduit further comprises positioning the conduit within an interior cavity of the air filter, such that unfiltered air is prevented from entering through the first opening and the second opening into the air inlet. In another exemplary embodiment, configuring the clamp further comprises configuring a screw mechanism of the clamp which is operable by way of a suitable tool passed through the second opening in the cap, the conduit, and the first opening in the base. In another exemplary embodiment, placing the clamp further comprises aligning the screw mechanism with the first opening, the conduit, and the second opening so as to facilitate operation of the clamp by way of the suitable tool.

BRIEF DESCRIPTION OF THE DRAWINGS

The drawings refer to embodiments of the present disclosure in which:

FIG. 3A illustrates a lower cross-sectional view of the air filter illustrated in FIG. 1, taken along a line 3A-3A;

FIG. 3B illustrates a cross-sectional view of the air filter illustrated in FIG. 1, taken along a line 3B-3B;

FIG. 4 illustrates a perspective view of an exemplary embodiment of a clamp configured to mount an air filter onto an air inlet of a turbocharger or a supercharger;

Figure 1:
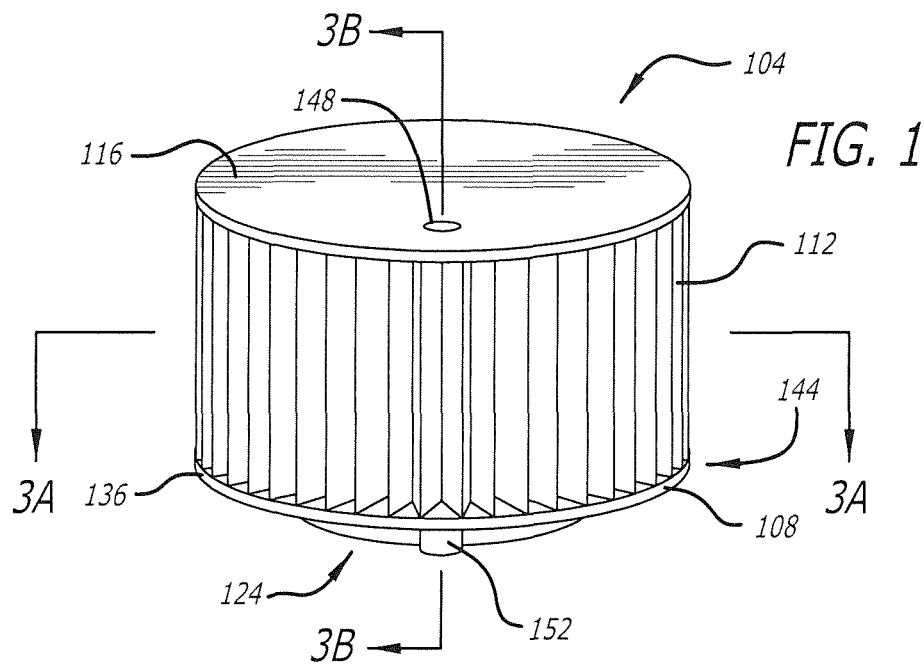
FIG. 1 illustrates an upper perspective view of an exemplary embodiment of an air filter configured to be mounted onto an air inlet of a turbocharger or a supercharger.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first clamp," may be made. However, the specific numeric reference should not be interpreted as a literal sequential order but rather interpreted that the "first clamp" is different than a "second clamp." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for an air filter configured to be mounted onto air inlets of turbochargers and superchargers. The air filter comprises a proximal base configured to support the air filter and provide an interface between the air filter and an air inlet of a turbocharger or a supercharger. The proximal base comprises an inlet receiver configured to receive the air inlet, a clamp configured to secure the air inlet within the inlet receiver, and a first opening aligned with a screw mechanism of the clamp. A filter medium is fastened to the proximal base and configured to remove particulate matter and other contaminates from an incoming air stream so as to prevent them from entering into the air inlet. A distal end cap is fastened to the filter medium and comprises a second opening aligned with the first opening. A conduit within an interior cavity of the air filter is disposed between the first opening and the second opening. The first opening and the second opening facilitate tightening and loosening the clamp by extending an appropriate tool through the interior cavity by way of the conduit so as to engage the screw mechanism of the clamp.

Figure 2:
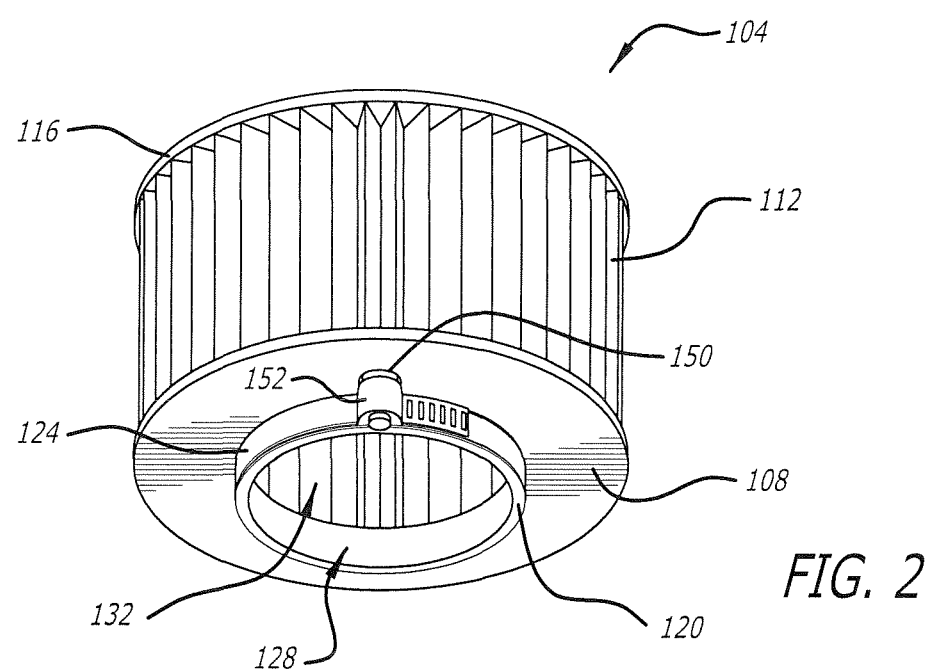
FIG. 2 illustrates a lower perspective view of an exemplary embodiment of an air filter configured to be mounted onto an air inlet of a turbocharger or a supercharger.

FIGS. 1-3 illustrate an exemplary embodiment of an air filter 104 configured to be mounted onto an air inlet of a turbocharger or a supercharger (hereinafter "turbocharger"). As illustrated in FIGS. 1-2, the air filter 104 comprises a proximal base 108, a filter medium 112, and a distal end cap 116. As best illustrated in FIG. 2, the proximal base 108 further comprises an inlet receiver 120, a clamp 124, and an opening 128. The air filter 104 preferably is comprised of materials that are sufficiently durable and temperature resistant so as to retain its configuration during installation and operation when coupled with the air inlet of the turbocharger.

The proximal base 108 generally is configured to support the air filter 104 and provide an interface between the air filter 104 and air inlet of the turbocharger. The inlet receiver 120 is configured to receive the air inlet of the turbocharger, and the clamp 124 is configured to secure the air inlet within the inlet receiver 120 such that air is drawn through the filter medium 112 into an interior cavity 132 of the air filter 104 and then is conducted through the opening 128 into the air inlet of the turbocharger. It will be appreciated that the inlet receiver 120 has a configuration, and the opening 128 has a diameter, suitable to accept the air inlet of the turbocharger. For example, the inlet receiver 120 may comprise any of a variety of additional ridges, or raised portions, so as to optimally engage the air inlet of the turbocharger. The specific configuration of the inlet receiver 120 and the diameter of the opening 128 depend upon the particular make and model of the turbocharger for which the air filter 104 is to be utilized, and thus a wide variety of configurations and diameters may be incorporated into the air filter 104 without straying beyond the scope of the present disclosure.

As best shown in FIGS. 1 and 3A, the proximal base 108 comprises a ridge 136 and a recess 140 configured to receive a proximal end 144 of the air filter 104. It is envisioned that any of a variety of fasteners (not shown) may be used to affix the proximal end 144 within the recess 140. In some embodiments, the ridge 136 may be molded to a wire support of the air filter 104. In some embodiments, the ridge 136 may be crimped such that it folds onto and retains the wire support and the filter medium 112 of the air filter 104. It will be appreciated that by those skilled in the art that, in some embodiments, fastening the filter medium 112 to the proximal base 108 by way of the ridge 136 and the recess 140 renders the filter medium 112 irremovable from the air filter 104.

It is envisioned that a user of the air filter 104 may periodically clean the filter medium 112 rather than replacing the air filter 104, as is typically done with conventional air filter systems. In some embodiments, a method for cleaning the filter medium 112 comprises removing the air filter 104 from the air inlet of the turbocharger, inserting a water hose through the opening 128 into the interior cavity 132 of the filter, and spraying water so as to flush contaminants from the filter medium 112. In some embodiments, the method for cleaning the air filter 104 comprises utilizing a high pressure air hose in lieu of the water hose. In some embodiments, the method for cleaning the air filter 104 comprises spraying water onto the exterior of the filter medium 112, such that the water and contaminants drain from the exterior of the filter medium 112. Other cleaning methods will be apparent to those skilled in the art without deviating from the spirit and scope of the present disclosure.

As discussed above, the proximal end 144 of the filter medium 112 is fastened to the proximal base 108 by way of the ridge 136 and the recess 140. The distal end cap 116 may be similarly affixed to the filter medium 112 by way of any of a variety of fasteners (not shown). In some embodiments, the distal end cap 116 may be molded to a wire support of the filter medium 112, as discussed herein. In some embodiments, the distal end cap 116 may be crimped around its peripheral edge such that it folds onto and retains the wire support and the filter medium 112 of the air filter 104. In some embodiments, a simple nut and bolt may be used to attach the filter medium 112, the wire support, and the distal end cap 116 onto the proximal base 108 such that the proximal end 144 is held fixed within the recess 140. Any of a variety of fastening means may be practiced for attaching the filter medium 112, the wire support, and the distal end cap 116 onto the proximal base 108 without deviating from the spirit and scope of the present disclosure. Further, the distal end cap 116 preferably is comprised of a material which is sufficiently hard so as to retain the filter medium 112 in the desired configuration and support the air filter 104 when coupled to the air inlet of the turbocharger. The filter medium 112 is also preferably durable enough to withstand repeated cleaning and use, as discussed herein.

As discussed above, the wire support may be incorporated into the filter medium 112 so as to provide additional strength and durability to the air filter 104, thereby facilitating periodic cleaning and reusing the air filter 104 instead of discarding the filter after each application. In some embodiments, the filter medium 112 may be positioned between the wire support and one or more layers of a reinforcing material. For example, the wire support may comprise a wire screen positioned on an outer surface and an inner surface of the filter medium 112. In some embodiments, the wire screens may be comprised of powder-coated aluminum screen wire that is co-pleated along with the filter medium 112 so as to reinforce the air filter 104. In some embodiments, the inner surface of the filter medium 112 may comprise a stronger mesh reinforcement which is similar to those incorporated into Diesel filter applications. In some embodiments, additional or alternative reinforcements may be provided, as will be apparent to those skilled in the art.

In the embodiment of the air filter 104 illustrated in FIGS. 1-3, the proximal base 108 has a diameter substantially equal to the diameter of the distal end cap 116. In some embodiments, however, the proximal base 108 may have a larger size than the size of the distal end cap 116. It should be understood that the air filter 104 of the present disclosure is not limited to the exact shape illustrated in FIGS. 1-3, but rather, may include a wide variety of generally cylindrical shapes, generally circular, oval, round, curved, or other closed perimeter shapes, that provide a relatively large surface area of the filter medium 112. In some embodiments, the filter medium 112 may comprise various heights other than as shown in FIGS. 1-3, as well as comprising inverse cone-shapes. In some embodiments, the air filter 104 may comprise inverted filter cones inserted so as to increase air flow through the filter medium 112.

In the embodiment illustrated in FIG. 1, the distal end cap 116 comprises a first opening 148 aligned with a screw mechanism 152 of the clamp 124. A second opening 150 in the proximal base 108 is also aligned with the screw mechanism 152, as shown in FIG. 2. It will be appreciated that the screw mechanism 152 is configured to enable a user to tighten the clamp 124 during installation of the air filter 104 onto the air inlet of the turbocharger. Alternatively, the user may use the screw mechanism 152 to loosen the clamp during removal of the air filter 104 from the turbocharger.

FIG. 4 illustrates a perspective view of the clamp 124 in absence of the air filter 104. The clamp 124 comprises a metal band 156 including a perforated portion 160 which is received by the screw mechanism 152. The perforated portion 160 is configured to receive a worm gear, or other similar component within the screw mechanism 152 capable of engaging the perforated portion 160, such that when the worm gear is turned the metal band 156 is accordingly tightened or loosed. A drive head 154 is configured to receive a tool suitable for turning the worm gear. The metal band 156 preferably comprises 301 stainless steel or other similar material. In some embodiments, the metal band 156 may be galvanized. As best illustrated in FIGS. 2 and 4, the screw mechanism 152 is disposed in a substantially perpendicular orientation relative to a circumference of the metal band 156. The substantially perpendicular orientation facilitates engaging the screw mechanism 152 with an appropriate tool positioned at substantially a right angle relative to the circumference of the metal band 156.

The first opening 148 and the second opening 150 facilitate tightening and loosening the clamp 124 by extending an appropriate tool into the first opening 148, through the interior cavity 132, and into the second opening 150 so as to engage the screw mechanism 152. As best illustrated in FIGS. 3A and 3B, a conduit 164 is positioned within the interior cavity 132 and disposed between the first opening 148 and the second opening 150. The conduit 164 is configured to guide the appropriate tool through the interior cavity 132 to the screw mechanism 152. The conduit 164 further serves to prevent unfiltered air from entering through the first and second openings 148, 150 and into the air inlet of the turbocharger.

Figure 5:
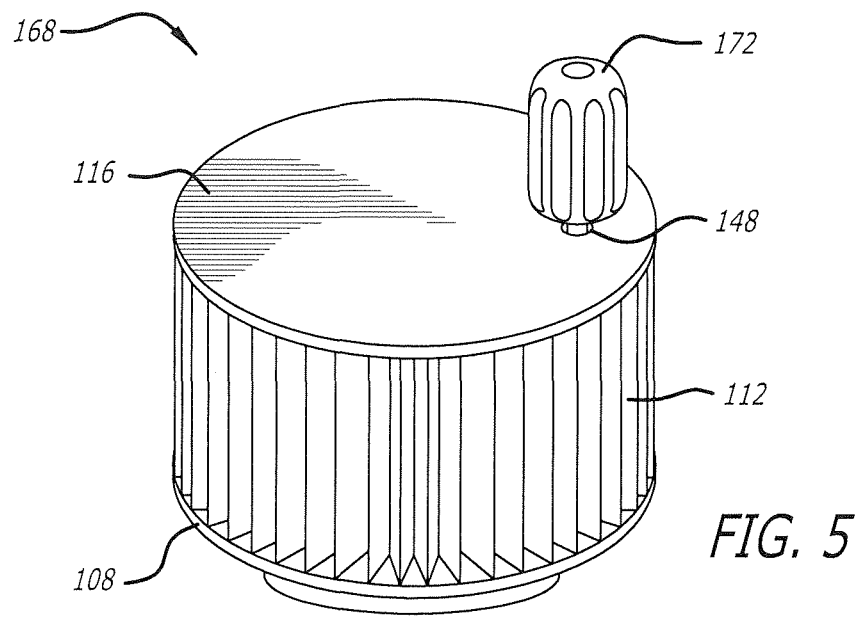
FIG. 5 illustrates an upper perspective view of an exemplary use environment wherein a screw driver is extended through an interior cavity of an air filter so as to adjust a clamp, whereby the air filter is mounted onto an air inlet of a turbocharger or a supercharger.
Figure 6:
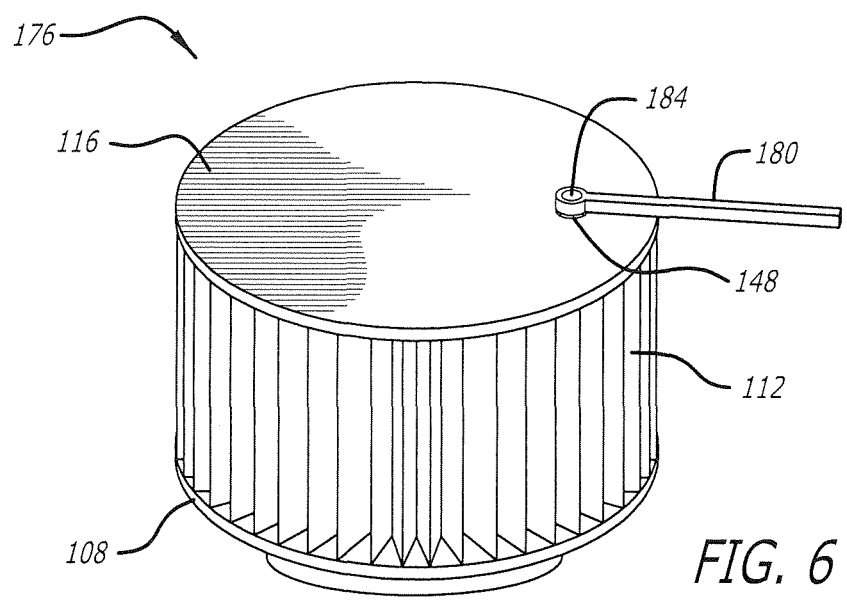
FIG. 6 illustrates an upper perspective view of an exemplary use environment wherein a wrench is used to turn a driver extending through an interior cavity of an air filter so as to adjust a clamp, whereby the air filter is mounted onto an air inlet of a turbocharger or a supercharger.

FIG. 5 illustrates a perspective view of an exemplary use environment 168 wherein a screw driver 172, or other similar appropriate tool, is extended into the first opening 148, through the conduit 164, and through the second opening 150 so as to adjust the clamp 124 by way of turning the drive head 154 of the screw mechanism 152. FIG. 6 illustrates a perspective view of an exemplary use environment 176 wherein a wrench 180 is being used to turn a driver 184 so as to adjust the clamp 124 by way of turning the screw mechanism 152. In the environment 168 of FIG. 6, the driver 184 extends into the first opening 148, through the conduit 164 in the interior cavity 132, through the second opening 150, and engages with the drive head 154 of the screw mechanism 152. Those skilled in the art will appreciate that accessing the screw mechanism 152 by way of the first opening 148 and the second opening 150 advantageously enables the inlet receiver 120 of the air filter 104 to be inset into the scroll of the turbocharger and then tightened onto the air inlet without the user having to apply force to the air filter 104 in an attempt expose the proximal base 108 and access the clamp 124.

As best shown in FIG. 2, the filter medium 112 circumferentially surrounds the interior cavity 132, such that the filter medium 112 creates an exterior perimeter of at least a portion of the interior cavity 132. As mentioned above, the exterior shape may be generally circular, oval, conical, or otherwise shaped to improve the surface area available for air flow passage for a given volume of the interior cavity 132. The shape may be consistent along a longitudinal length, as illustrated in FIGS. 1-3, or may vary along the length. For example, the outer profile may taper from the proximal base 108 to the distal end cap 116 so as to resemble a cone-shape, as discussed herein.

As will be appreciated by those skilled in the art, the filter medium 112 provides a surface area through which to pass an air stream and entrap particulate matter and other contaminates so as to prevent them from entering into the air inlet of the turbocharger. As such, the filter medium 112 may be comprised of paper, foam, cotton, spun fiberglass, or other known filter materials, woven or non-woven material, synthetic or natural, or any combination thereof. The filter medium 112 may be pleated, as illustrated in FIGS. 1-3, or otherwise shaped or contoured so as to increase the surface area for passing the air stream to be cleaned. In some embodiments, the filter medium 112 may comprise a combination of materials to create a hybrid filter medium. In some embodiments, the filter medium 112 may further comprise oil to enhance the air cleaning properties of the filter medium. Further, some embodiments may include a depth loading feature which gives the air filter 104 a high airflow with a low restriction while providing large contaminant holding capacities.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air filter for turbochargers and superchargers, comprising:
   a base for supporting a filter medium wherein base includes a ridge and a recess configured to fixedly receive an end of the filter medium;
   an end cap for enclosing an interior cavity of the filter medium; and
   a conduit disposed between a first opening in the base and a second opening in the end cap.

2. The air filter of claim 1, wherein the first opening and the second opening are configured to facilitate extending a tool through the conduit to engage a screw mechanism comprising a clamp for securing the air filter to an air inlet comprising the turbocharger or supercharger.

3. The air filter of claim 2, wherein the clamp comprises a metal band disposed around an inlet receiver comprising the base.

4. The air filter of claim 2, wherein the screw mechanism is configured to enable tightening and loosening the metal band.

5. The air filter of claim 1, wherein the base is configured to provide an interface between the air filter and an air inlet comprising the turbocharger or supercharger.

6. The air filter of claim 5, wherein the base includes an inlet receiver for receiving the air inlet and a clamp for securing the air inlet within the inlet receiver.

7. The air filter of claim 1, wherein the conduit is disposed within the interior cavity of the filter medium.

8. The air filter of claim 7, wherein the conduit is configured to guide a tool through the interior cavity to a screw mechanism comprising a clamp for securing the air filter to an air inlet comprising the turbocharger or supercharger.

9. The air filter of claim 7, wherein the conduit prevents unfiltered air from entering the interior cavity through one or more of the first opening and the second opening.

10. The air filter of claim 1, wherein the ridge is configured to be crimped onto the filter medium and an accompanying wire support.

11. The air filter of claim 10, wherein the ridge is configured to be molded onto the filter medium and the wire support.

12. A method for an air filter for turbochargers and superchargers, comprising:
   configuring a base for supporting a filter medium wherein configuring the base includes configuring a ridge and a recess to fixedly receive an end of the filter medium;
   forming an end cap for enclosing an interior cavity of the filter medium; and
   disposing a conduit between a first opening in the base and a second opening in the end cap.

13. The method of claim 12, wherein configuring the ridge and the recess includes crimping the ridge onto the filter medium and an accompanying wire support.

14. The method of claim 12, wherein configuring the ridge and the recess includes molding the ridge onto the filter medium and an accompanying wire support.

15. The method of claim 12, wherein configuring the base includes forming an inlet receiver to receive an air inlet comprising the turbocharger or supercharger.

16. The method of claim 12, wherein configuring the base includes forming the first opening; and wherein forming the end cap includes forming the second opening.

17. The method of claim 12, wherein disposing the conduit includes extending the conduit across the interior cavity.

18. The method of claim 12, wherein disposing the conduit includes aligning the conduit with a screw mechanism comprising a clamp for securing the base to an air inlet comprising the turbocharger or supercharger.

* * * * *